UNITED STATES PATENT OFFICE.

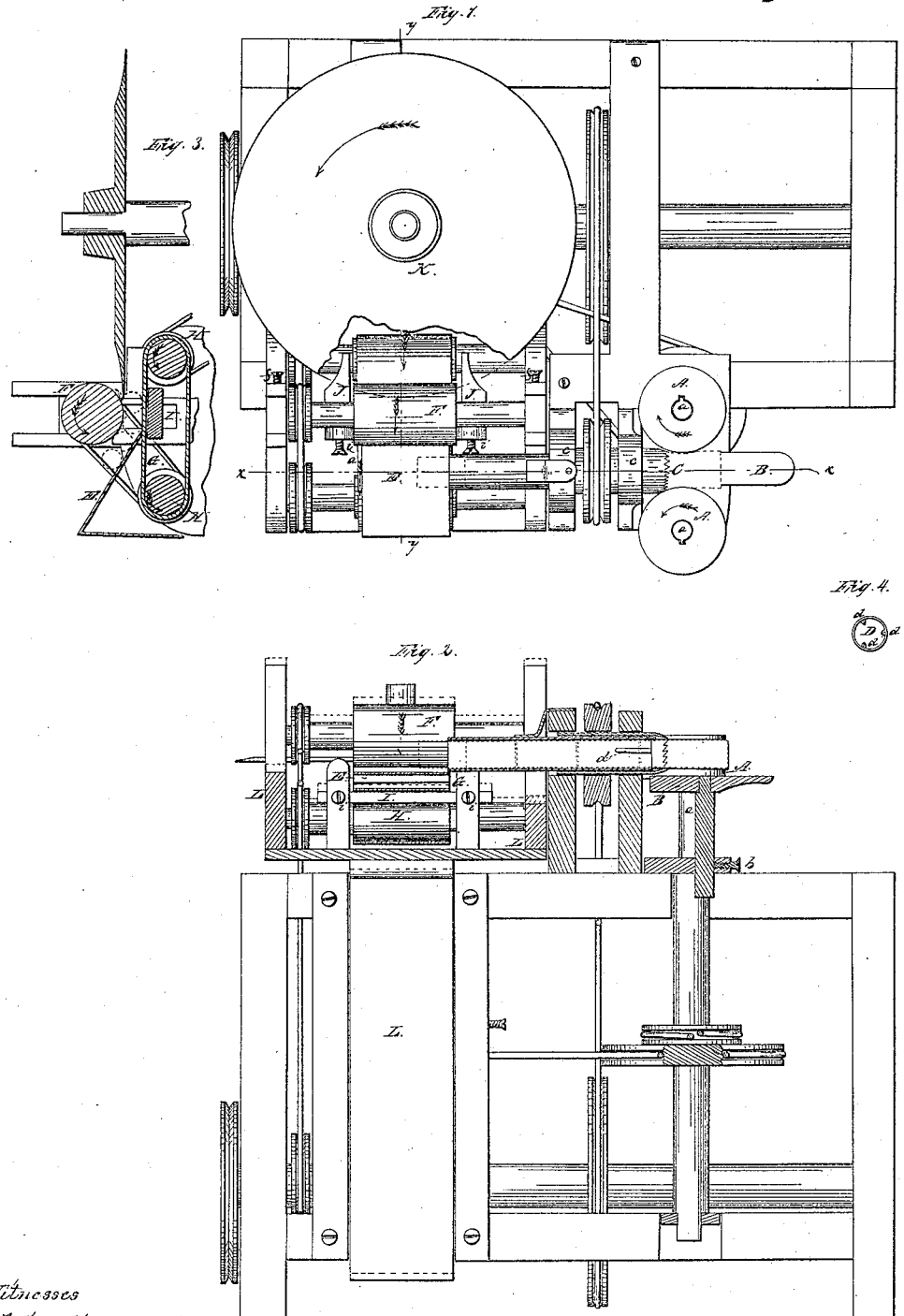

ALBERT ALBERTSON, OF NEW YORK, N. Y., ASSIGNOR TO CURTIS C. BEAN, OF SAME PLACE.

CORK-MACHINE.

Specification of Letters Patent No. 23,880, dated May 3, 1859.

*To all whom it may concern:*

Be it known that I, ALBERT ALBERTSON, of the city, county, and State of New York, have invented certain new and useful Improvements in Machines for Cutting Bottle-Corks; and I hereby declare the following to be a full and exact description of the same, reference being had to the accompanying drawings, making part of this specification, in which—

Figure 1, is a top view of a machine embodying my improvements. Fig. 2, is a vertical longitudinal section at *x x* Fig. 1. Fig. 3 is a vertical transverse section of the finishing knife and feed mechanism at *y y* Fig. 1. Fig. 4, is an end view of the stationary or inner cylinder hereinafter described.

This invention consists, 1st, in a device for holding corks against rotation while under the action of a rotary cylindrical cutter; 2nd, in a plan for rotating corks by friction on their periphery while under the action of a longitudinal cutter.

A, A, are feed rollers mounted on shafts *a a* and revolving in opposite directions in a horizontal plane.

B, is a bench on which the square blanks are placed to be fed to the machine. This bench is adjustable in height by means of a set screw *b*, to adapt it to cutters of different diameter.

C, is a rotary cylindrical cutter running in bearings *c*.

D, is a stationary cylinder extending within the cylindrical cutter to near its mouth and employed to conduct off the corks as cut and to hold their inner ends during the act of cutting by means of longitudinal projections *d*.

The portion of my machine above described is chiefly designed to perform the preparatory cutting or "roughing" of the corks. I now proceed to describe the apparatus by which they are completed.

E, is a chute board which receives the corks from the cylinder D, and conveys them forward toward the finishing knife.

F is a feed roller running in plumber blocks which are adjustable in height by means of set screws *f*.

G, is an endless band stretched upon rollers H, H.

The rollers F, and H, are moved in the same direction (as indicated by the arrows) but at different speeds the motion of the roller F, being somewhat the faster. The portion of the band immediately beneath the roller F, rests upon a shelf I, which is adjustable by set screws *i i* so as to vary its height to accord with the size of corks required or to set it obliquely with the cutter when it is desired to produce taper corks.

K, is the finishing knife which in the illustration here given consists of a disk rotating upon a vertical axis.

The band rollers H, H, and shelf I, are mounted in a common frame L, which is capable of vertical adjustment to adapt the machine to cut corks of various sizes and may be retained in any required position by set screws *l*, or any other substantially equivalent means.

J, J, are stops or rests which prevent the longitudinal motion of the corks while under the action of the knife K.

The operation is as follows. Square blanks cut to a suitable length being placed upon the bench B, (as shown in red) are clamped between the feed rollers A and thereby carried forward to the rotary cylindrical cutter C, within which they pass until gripped by the ribs *d*, on the stationary cylinder D, and are thereby firmly held against rotation. Successive corks being thus forwarded through the cylinder D, impel others before them until they fall one by one upon the inclined chute E, down which they pass by gravity until caught between the feed roller F and band G, the combined action of which rapidly rotates the cork and in consequence of the more rapid motion of the roller E, carries it forward at the same time, presenting all parts of its circumference to the action of the finishing knife K, until being reduced to a suitable size it is by the succeeding cork carried under the knife and falls into a spout or receiver beneath.

The cylindrical cutter C, may have either a smooth or a toothed edge and is detachable from the machine to admit of its being replaced by cutters of different sizes to correspond with the size of corks required. The feed rollers A may be adapted to blanks of various sizes either by any customary device to vary their proximity or by the use of a series of rollers of different sizes adapted to fit loosely on the shafts *a*. The bench B, is adjusted in height so as to correspond accurately with the cylindrical cutter C.

The described method of adapting the stationary cylinder D, to grip the corks by the periphery is found effectual in enabling the cylindrical cutter to produce a smooth surface to the extreme end of the blank after it has passed beyond control of the feed rollers A.

It will be observed that the motion of the apparatus by which the corks are fed to the finishing knife is continuous and uniform which enables it to operate with rapidity and preserves it from liability to derangement to an extent unattained by machines in which reciprocating motion is employed. The action of the oppositely moving surfaces of the roller and band is also found effectual in bringing the cork to an accurately parallel position and thus presenting them to the action of the knife.

The roller F may either be mounted on the adjustable frame L, as in the illustration here given or it may be directly attached to the main framework of the machine. In the former case any variation of the height of the frame L, must be accompanied by a separate adjustment of the roller F, in order to retain the latter in its proper position in relation to the cutter.

Springs may be applied above the plumber blocks $f$ and beneath the shelf I if desired.

The roughing and finishing apparatus respectively may be used as separate machines but are capable of more advantageous operation when combined as explained.

I do not restrict myself to any form or position of finishing knife as it is evident that its position may be vertical horizontal or oblique its motion continuous or reciprocating and its form either circular as in the illustration here given or it may be straight or in the form of an endless band either of which will operate with good effect in combination with my feed mechanism above described. Neither do I wish to be understood as confining myself to the precise arrangement here shown of the band G, rollers H, H, and shelf I for it will be clearly apparent that without varying the principle of the invention the rollers may be placed in such proximity or so increased in number as to entirely dispense with the band G and shelf I, or a second endless band running upon rollers may be substituted for the upper roller F.

I am aware that feed rollers substantially similar to my feed rollers A, have been employed to forward blanks to a rotary cylindrical cutter and I am also aware that a stationary cylinder has been applied within or in the rear of such cylindrical cutter to receive the corks when cut and conduct them away but I know of no instance in which the said stationary cylinder has been adapted to effectively hold the corks so as to prevent them from being rotated by the action of the cutter after they pass beyond the reach of the feed rollers.

I claim therefore as new and of my invention and desire to secure by Letters Patent—

1. The stationary cylinder D, $d$, or any substantially equivalent device when employed to grip a cork by its periphery so as to effectually prevent its rotation while being cut by a rotary cylindrical cutter.

2. The feed rollers F, H, H, (with or without the band G,) arranged and adapted to rotate a cork by friction upon its periphery, while under the action of a longitudinal cutter.

In testimony of which invention, I hereunto set my hand.

ALBERT ALBERTSON.

Witnesses:
 EDM. F. BROWN,
 OCT'S KNIGHT.